(12) United States Patent
Tebje et al.

(10) Patent No.: US 12,181,356 B2
(45) Date of Patent: Dec. 31, 2024

(54) MICROMECHANICAL COMPONENT FOR A PRESSURE AND INERTIAL SENSOR DEVICE

(71) Applicant: Robert Bosch GmbH, Stuttgart (DE)

(72) Inventors: Lars Tebje, Reutlingen (DE); Jochen Reinmuth, Reutlingen (DE); Johannes Classen, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 401 days.

(21) Appl. No.: 17/641,593

(22) PCT Filed: Sep. 4, 2020

(86) PCT No.: PCT/EP2020/074705
§ 371 (c)(1),
(2) Date: Mar. 9, 2022

(87) PCT Pub. No.: WO2021/058257
PCT Pub. Date: Apr. 1, 2021

(65) Prior Publication Data
US 2022/0326105 A1  Oct. 13, 2022

(30) Foreign Application Priority Data
Sep. 23, 2019 (DE) .................. 10 2019 214 414.4

(51) Int. Cl.
*G01L 19/00* (2006.01)
*G01L 9/00* (2006.01)
(Continued)

(52) U.S. Cl.
CPC ........ *G01L 19/0092* (2013.01); *G01L 9/0072* (2013.01); *G01L 13/025* (2013.01); *G01P 1/00* (2013.01); *G01P 15/125* (2013.01)

(58) Field of Classification Search
CPC .................................................. G01L 19/0092
See application file for complete search history.

(56) References Cited

U.S. PATENT DOCUMENTS

| 2004/0065932 A1* | 4/2004 | Reichenbach | ...... B81C 1/00293 |
| | | | 257/418 |
| 2007/0095148 A1 | 5/2007 | Takahashi | |
| | (Continued) | | |

FOREIGN PATENT DOCUMENTS

| CN | 109311656 A | 2/2019 |
| CN | 109313095 A | 2/2019 |
| | (Continued) | |

OTHER PUBLICATIONS

International Search Report for PCT/EP2020/074705, Issued Dec. 2, 2020.

*Primary Examiner* — Herbert K Roberts
(74) *Attorney, Agent, or Firm* — NORTON ROSE FULBRIGHT US LLP; Gerard A. Messina

(57) ABSTRACT

A micromechanical component for a pressure and inertial sensor device. The component includes a substrate having an upper substrate surface; a diaphragm having an inner diaphragm side oriented towards the upper substrate surface and an outer diaphragm side pointing away from the upper substrate surface, the inner diaphragm side bordering on an inner volume, in which a reference pressure is enclosed, and the diaphragm being able to be warped using a pressure difference between a pressure prevailing on its outer diaphragm side and the reference pressure; and a seismic mass situated in the inner volume, a sensor electrode, which projects out on the inner diaphragm side and extends into the inner volume, being displaceable with respect to the substrate due to a warping of the diaphragm. A pressure and inertial sensor device, and a method of manufacturing a
(Continued)

micromechanical component for a pressure and inertial sensor device, are also described.

7 Claims, 9 Drawing Sheets

(51) Int. Cl.
  *G01L 13/02* (2006.01)
  *G01P 1/00* (2006.01)
  *G01P 15/125* (2006.01)

(56) References Cited

U.S. PATENT DOCUMENTS

| | | |
|---|---|---|
| 2009/0308159 A1 | 12/2009 | Frey et al. |
| 2010/0242600 A1 * | 9/2010 | Lin .......................... G01P 15/18 |
| | | 73/514.32 |
| 2011/0126632 A1 * | 6/2011 | McNeil .................... B81B 7/02 |
| | | 73/718 |
| 2012/0256282 A1 * | 10/2012 | Lin .......................... B81B 7/02 |
| | | 257/E29.323 |
| 2014/0060169 A1 * | 3/2014 | McNeil .................... G01L 9/12 |
| | | 73/718 |
| 2015/0198493 A1 * | 7/2015 | Kaelberer ........... G01P 15/0802 |
| | | 73/718 |
| 2018/0072560 A1 | 3/2018 | Grutzeck et al. |

FOREIGN PATENT DOCUMENTS

| | | | | |
|---|---|---|---|---|
| DE | 102006024671 A1 | | 11/2007 | |
| DE | 102006026880 A1 | | 12/2007 | |
| DE | 102006011545 B4 | * | 3/2016 | ............... B81B 7/02 |
| DE | 102016209241 A1 | * | 11/2017 | ........... G01L 9/0072 |
| EP | 3159301 A1 | * | 4/2017 | ........... B81B 3/0078 |
| WO | WO-2006066997 A1 | * | 6/2006 | ........... G01L 9/0073 |

* cited by examiner

MICROMECHANICAL COMPONENT FOR A PRESSURE AND INERTIAL SENSOR DEVICE

FIELD

The present invention relates to a micromechanical component for a pressure and inertial sensor device, and to a pressure and inertial sensor device. The present invention also relates to a method of manufacturing a micromechanical component for a pressure and inertial sensor device.

BACKGROUND INFORMATION

German Patent Application No. DE 10 2006 024 671 A1 describes a micromechanical component, which includes a stretched-out diaphragm that seals an inner volume in an airtight manner between an inner side of the diaphragm and a carrier, such that the diaphragm may warp due to a pressure difference between a pressure prevailing on an outer side of the diaphragm pointing away from the carrier and a reference pressure prevailing in the inner volume. In addition, a seismic mass is situated in the inner volume. In addition, with the aid of a capacitance generated from the seismic mass and rigid electrodes situated in the inner volume, measurements of accelerations of the micromechanical component should be possible. In addition, measurements of pressure or sound should be possible with the aid of a further capacitance generated from the diaphragm and the seismic mass or from the diaphragm and the rigid electrodes.

SUMMARY

The present invention provides a micromechanical component for a pressure and inertial sensor device; a pressure and inertial sensor device; and a method of manufacturing a micromechanical component for a pressure and inertial sensor device.

The present invention provides advantageous options for jointly integrating a pressure sensor structure and an inertial sensor structure on/in a microchip. The options provided by the present invention for jointly integrating a pressure sensor structure and an inertial sensor structure enable particularly effective utilization of a chip surface of the specific microchip, which means that miniaturization of a pressure and inertial sensor device is facilitated and production costs in the manufacture of a pressure and inertial sensor device may be reduced.

In comparison with the related art described above, a particular advantage of the present invention is that the constructing of the micromechanical component of the present invention to include a sensor electrode projecting out on the inner diaphragm side and extending into the inner volume allows interaction of the sensor electrode with a sensor counter electrode attached directly or indirectly to the upper substrate surface. Thus, this eliminates the necessity of the above-described related art to use the seismic mass or a "rigid electrode" interacting with the seismic mass as a counter-electrode for the diaphragm. In addition, the constructing of the micromechanical component of the present invention to include the sensor electrode projecting out on the inner diaphragm side and extending into the inner volume allows the sensor counter-electrode interacting with the sensor electrode to be positioned directly or indirectly on the upper substrate surface, at a comparatively short distance from the sensor electrode. Thus, the interaction between the sensor electrode and the sensor counter-electrode is suitable for detecting or measuring the pressure prevailing on the outer diaphragm side with a comparatively high degree of sensitivity, an effective measurement accuracy, and a negligibly small error rate.

In one advantageous specific embodiment of the micromechanical component in accordance with the present invention, the seismic mass is made of at least one semiconductor material of a semiconductor material layer or semiconductor material layer stack; the sensor electrode also being made at least partially of the at least one semiconductor material of the semiconductor material layer or semiconductor material layer stack. Consequently, the semiconductor material layer or the semiconductor material layer stack may be used as a single micromechanical functional layer for both forming the seismic mass and forming at least a portion of the sensor electrode. This also facilitates miniaturization of the specific embodiment of the micromechanical component described here.

As an advantageous further refinement of the present invention, a reference electrode situated in the inner volume and formed independently of the seismic mass may also be made, in addition, of the at least one semiconductor material of the semiconductor material layer or semiconductor material layer stack. In this case, integration of the reference electrode, whose function is explained in even more detail below, into the inner volume, also does not contribute/ scarcely contributes to an increase in the dimensions of the specific embodiment of the micromechanical component described here.

In one further advantageous specific embodiment of the micromechanical component in accordance with the present invention, the seismic mass is connected to the upper substrate surface by at least one spring device in such a manner, that the seismic mass may be set into a displacement motion having a component of motion directed along an axis of movement oriented in parallel with the upper substrate surface; at least one grounding counter-electrode being securely positioned in the inner volume in such a manner, that if the seismic mass is set into a displacement motion having a component of motion directed along the axis of movement, a specific distance from the seismic mass to the respective grounding counter-electrode varies. Therefore, in the case of the specific embodiment of the micromechanical component described here, the seismic mass may be used reliably for identifying or detecting an acceleration of the micromechanical component, having at least an acceleration component directed along the axis of movement.

Alternatively, the seismic mass may also include a rocker-arm structure, which may be set into a rocking motion about an axis of tilt oriented parallelly to the upper substrate surface; a first grounding counter-electrode and a second grounding counter-electrode being attached directly or indirectly to the upper substrate surface in such a manner, that if the rocker-arm structure of the seismic mass is set into a rocking motion about the axis of tilt, a first distance of the rocker-arm structure from the first grounding counter-electrode and a second distance of the rocker-arm structure from the second grounding counter electrode, vary. The specific embodiment of the micromechanical component described here may advantageously be used to reliably identify or detect an acceleration of the micromechanical component having an acceleration component oriented perpendicularly to the upper substrate surface.

In particular, at least one reference counter-electrode may also be attached directly or indirectly to the upper substrate surface, between the first grounding counter-electrode and the second grounding counter-electrode. As explained below in further detail, in this case, the at least one reference counter-electrode may be used for reference measurements to increase a measurement accuracy of measurements of the pressure prevailing on the outer diaphragm side; the measurements being carried out with the aid of the sensor electrode and a sensor counter-electrode attached to the upper substrate surface.

The advantages described above are also provided in a pressure and inertial sensor device including such a micromechanical component. The pressure and inertial sensor device may be understood as a sensor device, which may perform both functions of a pressure sensor or acoustic sensor and functions of an inertial sensor, such as an acceleration sensor, a yaw-rate sensor or an angular acceleration sensor.

In addition, the execution of a corresponding method of manufacturing a micromechanical component for a pressure and inertial sensor device also provides the advantages described above. It is expressly emphasized that the manufacturing method may be refined further in such a manner, that all of the above-described specific embodiments of the micromechanical component may be produced by it.

BRIEF DESCRIPTION OF THE DRAWINGS

Additional features and advantages of the present invention are explained below in light of the figures.

FIG. 1B shows a cross section along line A-A' of FIG. 1A.

FIG. 2B shows a cross section along line B-B' of FIG. 2A.

FIG. 3B shows a cross section along line C-C' of FIG. 3A, and FIG. 3C shows a cross section along line D-D' of FIG. 3A.

FIG. 4B shows a cross section along line E-E' of FIG. 4A.

DETAILED DESCRIPTION OF EXAMPLE EMBODIMENTS

Figure 1A:
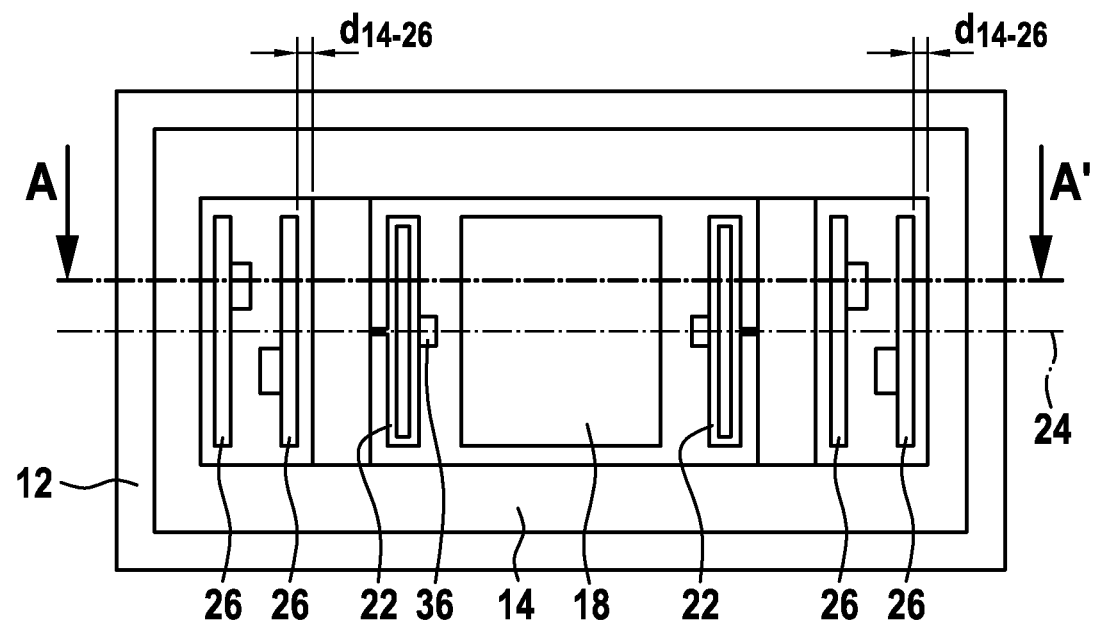
FIGS. 1A and 1B show a top view and a cross section of a first specific embodiment of the micromechanical component in accordance with the present invention, where
Figure 1B:
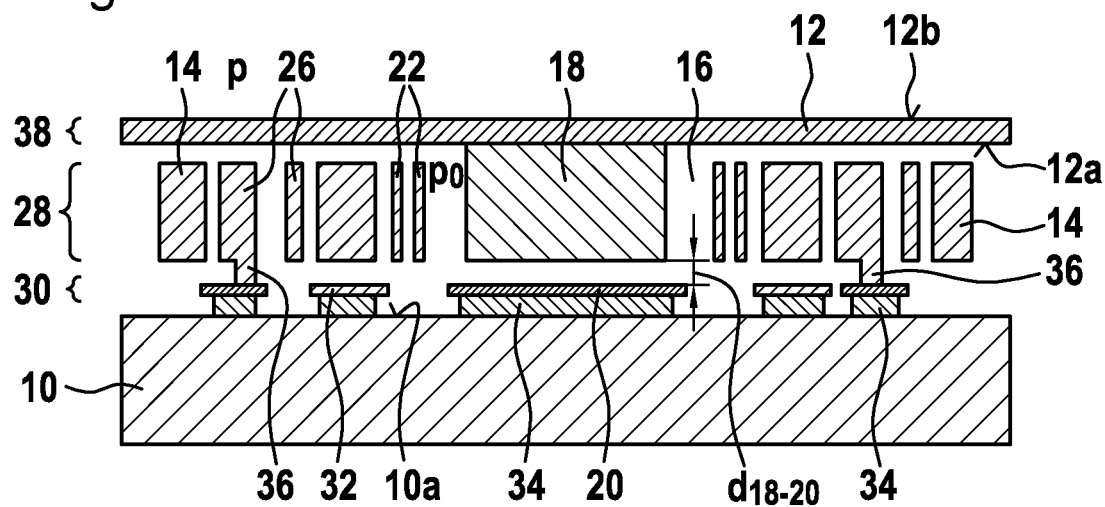

FIGS. 1A and 1B show a top view and a cross section of a first specific embodiment of the micromechanical component, where FIG. 1B shows a cross section along line A-A' of FIG. 1A.

The micromechanical component represented schematically in FIGS. 1A and 1B includes a substrate 10 having an upper substrate surface 10a; a stretched-out diaphragm 12 having an inner diaphragm side 12a oriented towards upper substrate surface 10a and an outer diaphragm side 12b pointing away from upper substrate surface 10a; and a seismic mass 14. Inner diaphragm side 12a borders on an inner volume 16, in which a reference pressure $p_0$ is enclosed that may differ from a pressure p prevailing on outer diaphragm side 12b. Diaphragm 12 is designed to be deformable in such a manner, that diaphragm 12 may warp/warps with the aid of a pressure difference between pressure p prevailing on outer diaphragm side 12b and reference pressure $p_0$ prevailing in the inner volume. In addition, seismic mass 14 is situated in inner volume 16.

The micromechanical component additionally includes a sensor electrode 18, which projects out on inner diaphragm side 12a, extends into inner volume 16, and is displaceable/displaced with respect to substrate 10 via warping of diaphragm 12. Sensor electrode 18 may optionally be formed in one piece or multiple parts. In both cases, the sensor electrode 18 projecting out on inner diaphragm side 12a implements the advantages of a stiffening structure of diaphragm 12, such as, in particular, the ensuring of comparatively marked deformation of an edge region of diaphragm 12 in response to a pressure difference on its diaphragm sides 12a and 12b, which means that a deflection of a middle region of diaphragm 12 framed by the edge region is increased. As is additionally apparent in FIG. 1B, the sensor electrode 18 projecting out on inner diaphragm side 12a may advantageously interact with a sensor counter-electrode 20 directly or indirectly attached to upper substrate surface 10a; it being able to be ensured that in response to equal pressures on diaphragm sides 12a and 12b, sensor electrode 18 is at a comparatively short distance $d_{18-20}$ from sensor counter electrode 20. Therefore, the formation of the sensor electrode 18 projecting out on inner diaphragm side 10a also increases a sensitivity of measurements of pressure p prevailing on outer diaphragm side 12b, which are carried out with the aid of diaphragm 12. The sensor electrode 18 used as a mechanical stiffening structure also ensures a slight degree of nonlinearity between an increase or decrease in the pressure difference on diaphragm sides 12a and 12b and a corresponding decrease or increase in distance $d_{18-20}$, which facilitates an evaluation of pressure measurements carried out with the aid of diaphragm 12, sensor electrode 18 and sensor counter-electrode 20. Thus, electronics, which have a comparatively simple design, are inexpensive, and require relatively little space, may be used for the pressure measurements.

Seismic mass 14 may also be used for performing measurements. In the specific embodiment of FIGS. 1A and 1B, seismic mass 14 is connected to upper substrate surface 10a by at least one spring device 22 in such a manner, that seismic mass 14 may be set into a displacement motion having a component of motion directed along an axis of movement 24 oriented in parallel with upper substrate surface 10a. In particular, seismic mass 14 may be set into a displacement motion directed along axis of movement 24. In addition, at least one grounding counter-electrode 26 is securely positioned in inner volume 16 in such a manner, that if seismic mass 14 is set into a displacement motion having the component of motion directed along axis of movement 24, a specific distance $d_{14-26}$ from seismic mass 14 to respective grounding counter-electrode 26 varies. Consequently, seismic mass 14 and the at least one grounding counter-electrode 26 are especially well-suited for reliably detecting or measuring an acceleration of the micromechanical component along the axis of movement 24 oriented parallelly to upper substrate surface 10a.

Therefore, the micromechanical component described here is suitable not only for detecting and/or measuring a pressure difference between reference pressure $p_0$ and pressure p prevailing on outer diaphragm side 12b, but also for detecting and/or measuring an acceleration of the micromechanical component along axis of movement 24. In addition, in the micromechanical component, diaphragm 12 may also be used as "thin-layer encapsulation" for seismic mass 14 and the at least one grounding counter-electrode 26 consequently interacting with it, which means that this multifunctionality of diaphragm 12 is used for additionally protecting seismic mass 14 and the at least one grounding counter-electrode 26. A further advantage of the micromechanical component is the integration of its sensitive components 12, 14, 18, 20, and 26 into a comparatively small volume, through which miniaturization of the micromechanical component is made easier and materials may be saved during the manufacturing of the micromechanical component.

As a further advantage of the micromechanical component described here, not only is seismic mass 14 made of at least one semiconductor material of a semiconductor material layer 28 or semiconductor material layer stack, but also sensor electrode 18 is made at least partially of the at least one semiconductor material of semiconductor material layer 28 or semiconductor material layer stack, as well. Optionally, at least one limit-stop structure (not shown in FIGS. 1A and 1B) for seismic mass 14 may also be formed from semiconductor layer 28 or the semiconductor layer stack.

Thus, the micromechanical component described here may be manufactured, using a comparatively low amount of energy. For example, a wiring and electrode material layer 30 may initially be deposited directly or indirectly on upper substrate surface 10a of substrate 10. Subsequently, both sensor counter-electrode 20 and lines 32 of the micromechanical component may be formed/patterned from wiring and electrode material layer 30. By depositing wiring and electrode material layer 30 on at least one insulating layer 34 covering the upper substrate surface 10a at least partially, the structures 20 and 32 formed from wiring and electrode material layer 30 may also be insulated electrically from substrate 10. Semiconductor material layer 28 or the semiconductor material layer stack may then be deposited on a sacrificial layer (not shown in FIG. 1B), which at least partially covers upper substrate surface 10a, the at least one insulating layer 34, and/or the structures 20 and 32 formed from wiring and electrode material layer 30. By forming at least one opening passing through the sacrificial layer, prior to depositing semiconductor material layer 28 or the semiconductor material layer stack, subsequent anchors 36 of the at least one spring device 22 and/or of the at least one grounding counter-electrode 26 may be formed on upper substrate surface 10a and/or on lines 32. Subsequently, by depositing a diaphragm cover layer 38 on a further sacrificial layer, which covers the layer construction described here at least partially, but is not shown in FIG. 1B, diaphragm 12 may be completed. The layer construction represented schematically in FIG. 1B may then be acquired by removing the sacrificial layers at least partially.

Consequently, movable sensor components 12, 14, and 18 of the micromechanical component may be formed from two functional layers 28 and 38 (semiconductor material layer 28 and diaphragm cover layer 38). In addition, all of the fixed electronic structures 20 and 32 of the micromechanical component lying outside of the two functional layers 28 and 38 may also be formed with the aid of the wiring and electrode material layer 30. Therefore, comparatively few deposition steps are needed for manufacturing the micromechanical component described here. For example, silicon may be used as the at least one semiconductor material of semiconductor material layer 28 or the semiconductor material layer stack. Silicon may also be deposited for diaphragm cover layer 38. The material of wiring or electrode material layer 30 may be, for example, a metal or doped silicon. Thus, comparatively inexpensive and easily processable materials may also be used for manufacturing the micromechanical component. The sacrificial layers may be made of, for example, silicon dioxide.

Figure 2A:
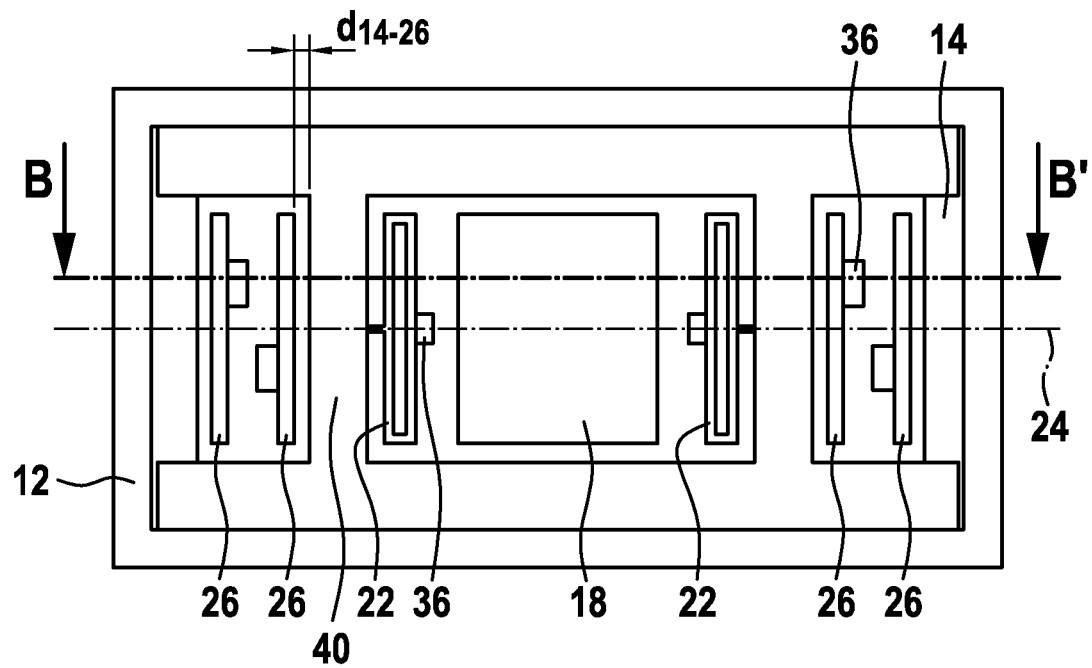
FIGS. 2A and 2B show a top view and a cross section of a second specific embodiment of the micromechanical component in accordance with the present invention, where
Figure 2B:
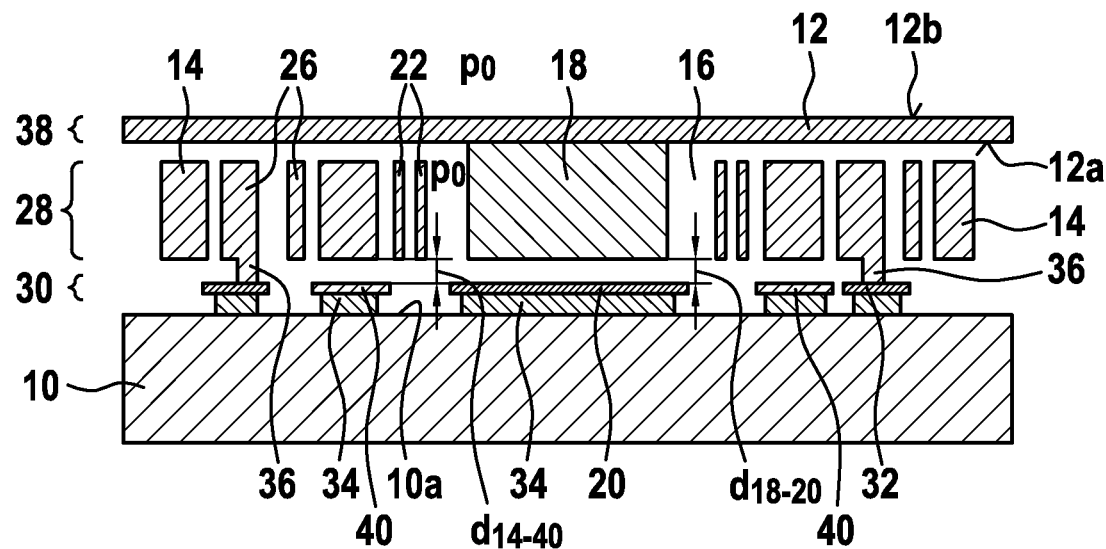

FIGS. 2A and 2B show a top view and a cross section of a second specific embodiment of the micromechanical component, where FIG. 2B shows a cross section along line B-B' of FIG. 2A.

The micromechanical component schematically represented in FIGS. 2A and 2B is a further refinement of the specific embodiment described above. To that end, the micromechanical component of FIGS. 2A and 2B also includes at least one reference counter-electrode 40, which is attached directly or indirectly to upper substrate surface 10. The at least one reference counter-electrode 40 is preferably positioned at a comparatively short distance $d_{14\text{-}40}$ from the seismic mass 14, which may be set into its displacement motion with at least one component of motion directed along axis of movement 24. Using such positioning of the at least one reference counter-electrode 40, one may take advantage of the fact that an acceleration of the micromechanical component along axis of movement 24 produces (substantially) no change in the distance $d_{14\text{-}40}$ between seismic mass 14 and the at least one reference counter-electrode 40.

The at least one reference counter-electrode 40 is advantageous for allowing a differential evaluation between the variable capacitance generated by sensor electrode 18 and sensor counter-electrode 20 and the capacitance generated between seismic mass 14 and reference counter-electrode 40, which does not change in response to pressure changes. Differential capacitance measurements are generally advantageous for implementing particularly simple and high-resolution electronic evaluation circuits. In addition, in the case of the differential evaluation of the capacitance generated by sensor electrode 18 and sensor counter-electrode 20 and the capacitance generated by seismic mass 14 and reference counter-electrode 40, if the geometric configuration of the electrodes is selected in a suitable manner, the influence of the deformation of substrate 10 is substantially canceled out. Consequently, one may reliably distinguish between changes in distance $d_{18\text{-}20}$, which are caused by a change in pressure p, and changes in distance $d_{18\text{-}20}$, which are attributable to deformation of substrate 10. The at least one reference counter-electrode 40 may be formed from wiring and electrode material layer 30.

Regarding further features and advantages of the micromechanical component of FIGS. 2A and 2B, reference is made to the specific embodiment explained above.

Figure 3A:
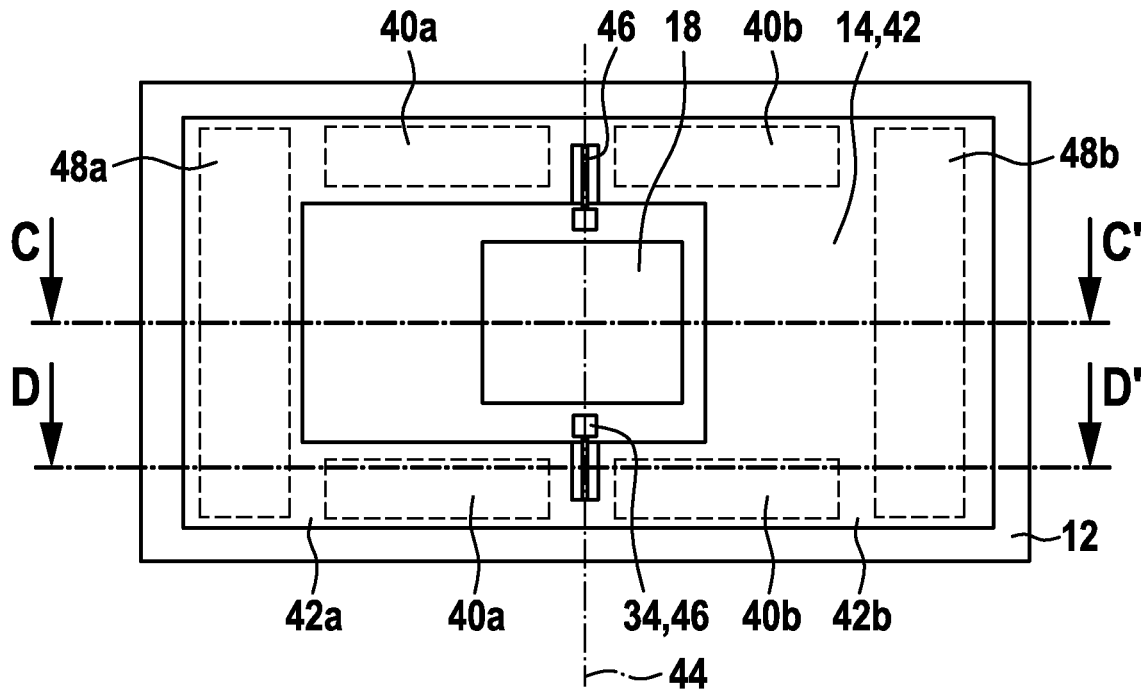
FIGS. 3A through 3C show a top view and cross sections of a third specific embodiment of the micromechanical component in accordance with the present invention, where
Figure 3B:
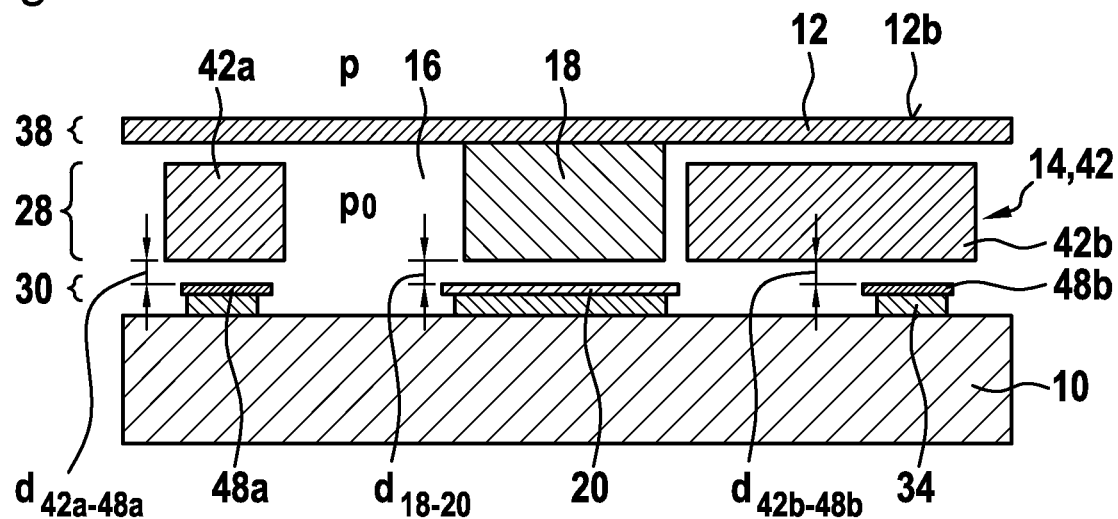
Figure 3C:
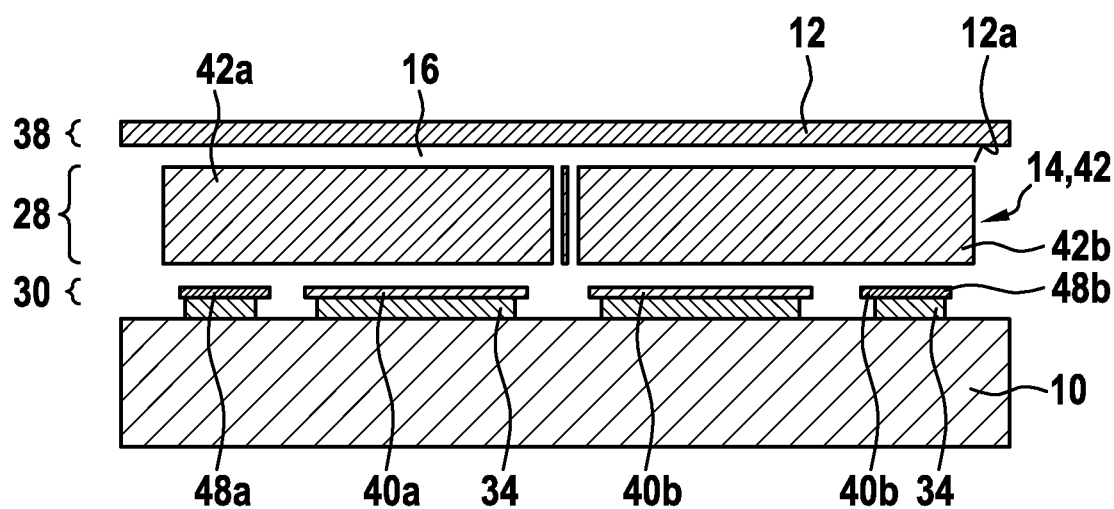

FIGS. 3A through 3C show a top view and cross sections of a third specific embodiment of the micromechanical component, where FIG. 3B shows a cross section along line C-C' of FIG. 3A, and FIG. 3C shows a cross section along line D-D' of FIG. 3A.

In the specific embodiment of FIG. 3A through 3C, seismic mass 14 includes a rocker-arm structure 42, which may be set into a rocking motion about an axis of tilt 44 oriented parallelly to upper substrate surface 10. To that end, rocker-arm structure 42 is connected to two anchoring points 36 with the aid of two torsion springs 46 extending along axis of tilt 44. Rocker-arm structure 42 may be understood to be a structure having a mass distribution asymmetrical with respect to a sectional plane containing axis of tilt 44. Thus, an acceleration of the micromechanical component in an acceleration direction oriented perpendicularly to upper substrate surface 10a causes a first rocker-arm part 42a of rocker-arm structure 42 lying on a first side of the sectional plane to move in a direction opposite to a second rocker-arm part 42b of rocker-arm structure 42 lying on a second side of the sectional plane.

A first grounding counter-electrode 48a and a second grounding counter-electrode 48b are attached directly or indirectly to upper substrate surface 10a in such a manner, that if rocker-arm structure 42 of seismic mass 14 is set into a rocking motion about axis of tilt 44, a first distance $d_{42a\text{-}48a}$ of first rocker-arm part 42a of rocker-arm structure 42 from first grounding electrode 48a and a second distance $d_{42b\text{-}48b}$ of second rocker-arm part 42b of rocker-arm structure 42 from second grounding electrode 48b, each vary. The two grounding counter-electrodes 48a and 48b are preferably positioned at rocker-arm structure 42 in such a manner, that if a rocking motion of rocker-arm structure 42 about axis of tilt 44 causes an increase in first distance $d_{42a\text{-}48a}$, second distance $d_{42b\text{-}48b}$ decreases, and if a rocking motion of rocker-arm structure 42 about axis of tilt 44 causes a decrease in first distance $d_{42a\text{-}48a}$, second distance $d_{42b\text{-}48b}$ increases. By subtracting the signals acquired with the aid of grounding counter-electrodes 48a and 48b, a particularly simple and high-resolution electronic evaluation circuit may be implemented for measuring changes in capacitance. In addition, "false signals" attributable to a deformation of substrate 10 may be filtered out automatically. Preferably, first grounding counter-electrode 48a is situated close to an end of first rocker-arm part 42a pointing away from the sectional plane, while second grounding counter-electrode 48b is situated close to an end of second rocker-arm part 42b pointing away from the sectional plane.

As an advantageous further refinement, at least one more reference counter-electrode 40a and 40b may be attached directly or indirectly to upper substrate surface 10a between first grounding counter-electrode 48a and the sectional plane and/or between second grounding counter-electrode 48b and the sectional plane. Preferably, at least one first reference counter-electrode 40a is situated between first grounding counter-electrode 48a and the sectional plane, and at least one second reference counter-electrode 40b is situated between second grounding counter-electrode 48b and the sectional plane. In this case, changes in pressure are advantageously measured differentially, using a change in a difference of the first capacitance generated by sensor electrode 18 and sensor counter-electrode 20 and the second capacitance generated by seismic mass 14 and reference counter-electrodes 40. The at least one reference counter-electrode 40a and 40b and/or the two grounding counter-electrodes 48a and 48b may also be formed from wiring and electrode material layer 30.

Regarding further features and advantages of the micromechanical component of FIGS. 3A through 3C, reference is made to the specific embodiments described above.

Figure 4A:
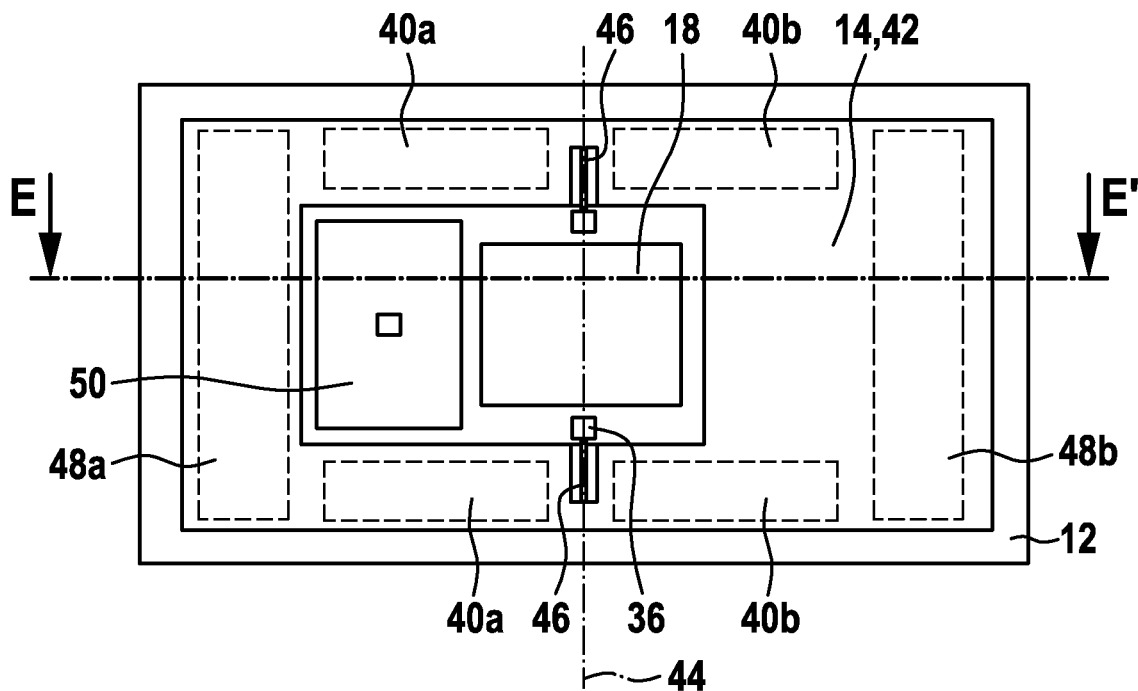
FIGS. 4A and 4B show a top view and a cross section of a fourth specific embodiment of the micromechanical component in accordance with the present invention, where
Figure 4B:
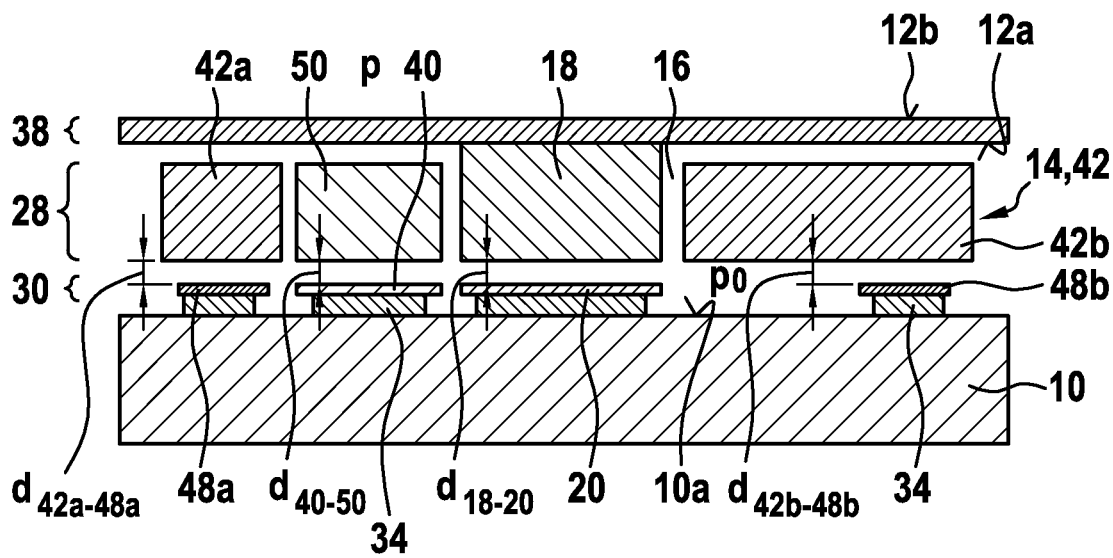

FIGS. 4A and 4B show a top view and a cross section of a fourth specific embodiment of the micromechanical component, where FIG. 4B shows a cross section along line E-E' of FIG. 4A.

As an alternative to, or in addition to the at least one reference counter-electrode 40a and 40b of the specific embodiment described above, the micromechanical component of FIGS. 4A and 4B includes one more reference electrode 50, which is situated in inner volume 16, is formed/may be displaced independently of seismic mass 14, and has a (further) reference counter-electrode 40 assigned to reference electrode 50. As is apparent in FIG. 4B, the reference electrode 50, which is situated in inner volume 16 and is formed/displaceable independently of seismic mass 14, may additionally be made of the at least one semiconductor material of semiconductor material layer 28 or the semiconductor material layer stack. The reference counter-electrode 40 positioned at a distance $d_{40\text{-}50}$ from reference electrode 50 may be formed from wiring and electrode material layer 30. In this case, changes in pressure are advantageously measured differentially, using a change in a difference of the first capacitance generated by sensor electrode 18 and sensor counter-electrode 20 and the second capacitance generated by reference electrode 50 and reference counter-electrodes 40.

Regarding further features and advantages of the micromechanical component of FIGS. 4A through 4B, reference is made to the specific embodiments described above.

Here, it is also emphasized that seismic mass 14 may also have a trampoline structure in place of a rocker-arm structure 42. In response to an acceleration of the micromechanical component in an acceleration direction oriented perpendicularly to upper substrate surface 10a, the trampoline structure then moves with a component of motion oriented perpendicularly to upper substrate surface 10a.

Figure 5:
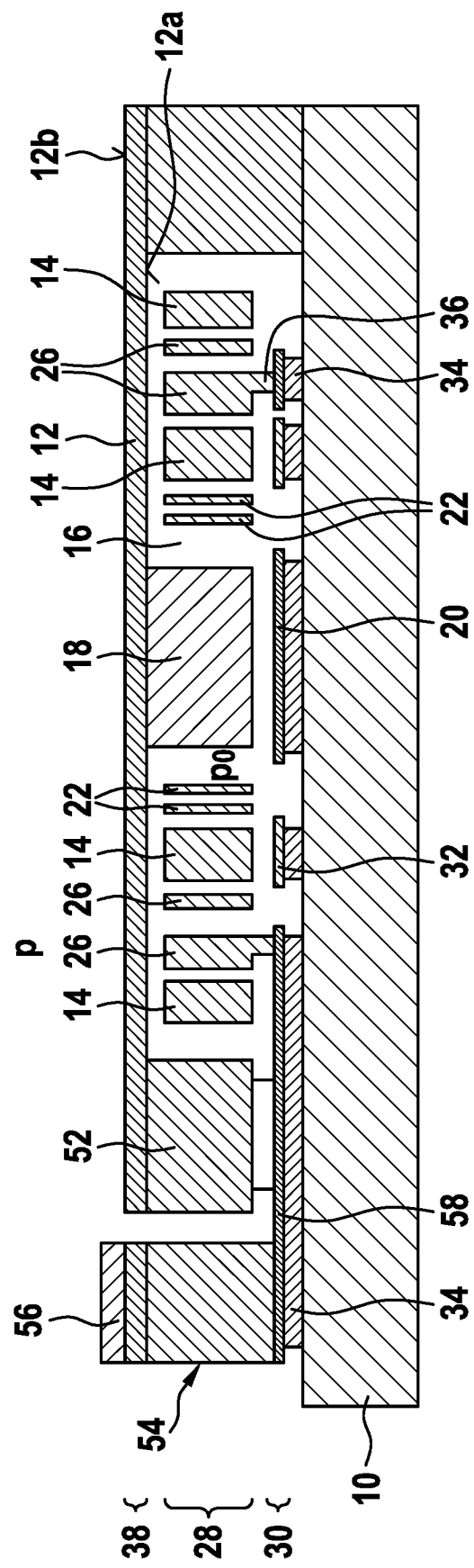
FIG. 5 shows a cross section of a fifth specific embodiment of the micromechanical component, in accordance with the present invention.

FIG. 5 shows a cross section of a fifth specific embodiment of the micromechanical component.

The micromechanical component represented schematically in FIG. 5 is a further refinement of the specific embodiment of FIGS. 1A and 1B. It is apparent that diaphragm 12 is stretched out on a frame structure 52. Frame structure 52 may be made at least partially of the at least one semiconductor material of semiconductor material layer 28 or the semiconductor material layer stack. Outside of frame structure 52, an electrical contact 54, which may be contacted electrically via a bonding pad 56, may also be made at least partially of the at least one semiconductor material of semiconductor material layer 28 or the semiconductor material layer stack. A circuit trace lead 58, via which the electrical contact 54 formed outside of frame part 52 is connected electrically to at least one component situated in inner volume 16, may also be formed from wiring and electrode material layer 30.

Regarding further features and advantages of the micromechanical component of FIG. 5, reference is made to the specific embodiment of FIGS. 1A and 1B.

Figure 6:
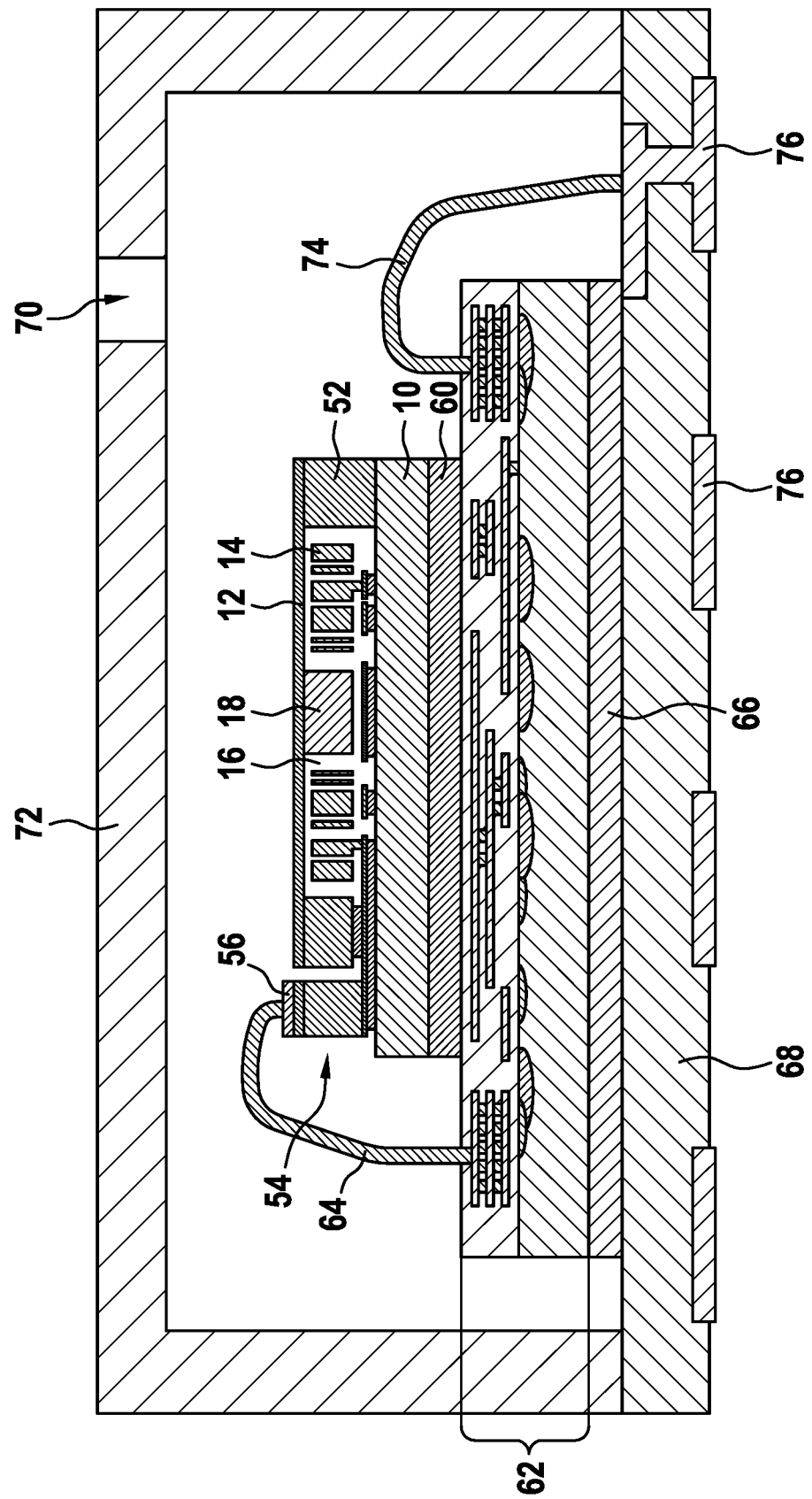
FIG. 6 shows a cross section of a sixth specific embodiment of the micromechanical component, in accordance with the present invention.

FIG. 6 shows a cross section of a sixth specific embodiment of the micromechanical component.

The micromechanical component represented schematically in FIG. 6 is a further refinement of the specific embodiment of FIG. 5. It is apparent that the micromechanical component of FIG. 5 is bonded to an evaluation ASIC 62 with the aid of an adhesive layer 60. In addition, a specific bonding pad 56 of the at least one electrical contact 54 may be connected electrically to evaluation ASIC 62 by at least one bonded wire 54. Evaluation ASIC 62 is securely bonded to a carrier part 68 with the aid of a further adhesive layer 66; carrier part 68 and a cover part 72 provided with a pressure inlet opening 70 forming the housing of the micromechanical component. Evaluation ASIC 62 may also be connected electrically to at least one soldering pad 76 of carrier part 68 via at least one (additional) bonded wire 74.

Regarding further features and advantages of the micromechanical component of FIG. 6, reference is made to the specific embodiments of FIGS. 11, 1B and 5.

Figure 7:
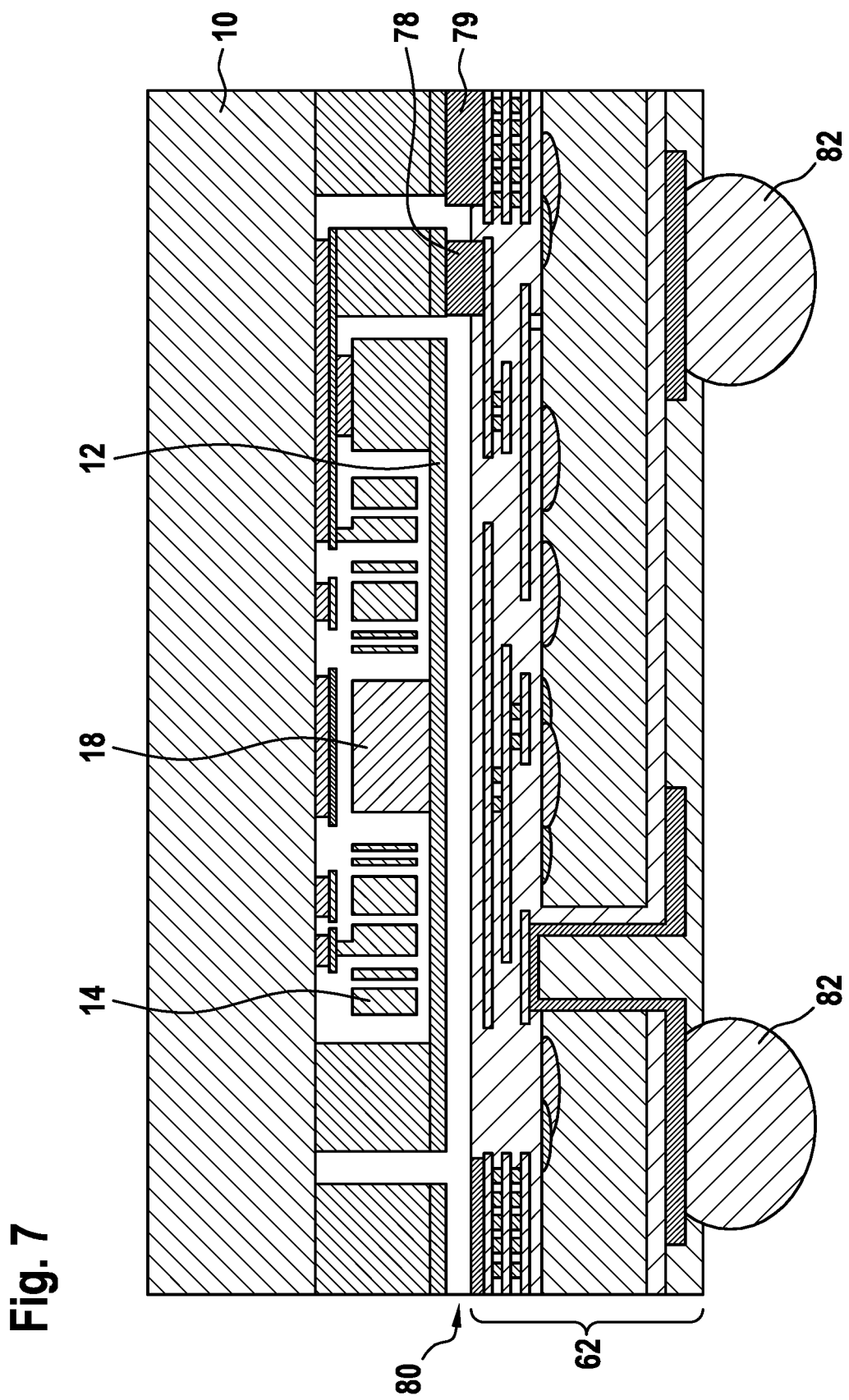
FIG. 7 shows a cross section of a seventh specific embodiment of the micromechanical component, in accordance with the present invention.

FIG. 7 shows a cross section of a seventh specific embodiment of the micromechanical component.

The micromechanical component schematically represented in FIG. 7 is also a further refinement of the specific embodiment of FIG. 5. For that, at least one chip-to-chip contact 78 and a bonding frame 79 are formed in such a manner on a side of the micromechanical component of FIG. 5 pointing away from substrate 10, that the micromechanical component of FIG. 5 may be bonded securely to an evaluation ASIC 62 via the at least one chip-to-chip contact 78 and bonding frame 79. The at least one chip-to-chip contact 78 and bonding frame 79 are positioned and formed in such a manner, that a pressure opening 80 to outer diaphragm side 12b of diaphragm 12 continues to be kept clear. Electrical contacting between the micromechanical component and evaluation ASIC 62 is ensured by the at least one chip-to-chip contact 78. Bonding frame 79 ensures hermetic sealing of the micromechanical component. For example, a metallic bonding method, such as, in particular, eutectic bonding utilizing aluminum and germanium, solid liquid interdiffusion bonding (SLID) utilizing copper and tin, a direct bonding method, or a thermocompression bonding method, may be used to form the at least one chip-to-chip contact 78 and bonding frame 79.

Due to the hermetic encapsulation of the micromechanical component of FIG. 7, outgassing effects of evaluation ASIC 62, which often stores considerable amounts of hydrogen and other gases in its metal-oxide layer stack, are irrelevant to the operation of the micromechanical component. In addition, the micromechanical component of FIG. 7 has a comparatively compact and inexpensive construction in the form of a "chip-scale package." With the aid of at least one solder ball 82, the micromechanical component of FIG. 7 may easily be connected to a further device.

All of the micromechanical components described above may advantageously be used as part of a pressure and inertial sensor device. Such a pressure and inertial sensor device may be used as both a pressure sensor or acoustic sensor and an inertial sensor, such as an acceleration sensor, a yaw rate sensor, and/or an angular acceleration sensor; a plurality of the physical quantities measurable by the different types of sensors being able to be measured simultaneously. Such a pressure and inertial sensor device may be used, for example, in the wheel-and-tire sensor system, where pressure signals and acceleration signals must often be measured simultaneously. Such a pressure and inertial sensor device may likewise be used successfully in the field of consumer electronics, as well, such as, for example, in smartphones. Since the manufacture of such a pressure and inertial sensor device is comparatively inexpensive and the finished pressure and inertial sensor device is relatively compact, it may also be used successfully for a number of other purposes.

Figure 8:
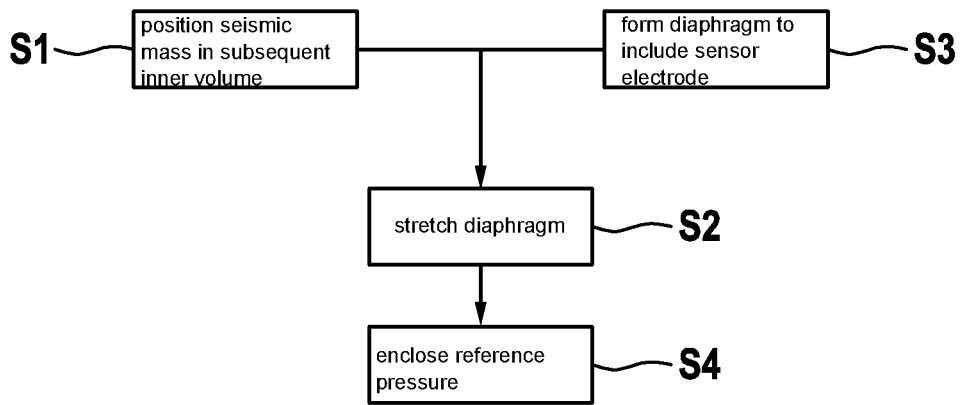
FIG. 8 shows a flow chart for explaining a specific embodiment of the method of manufacturing a micromechanical component for a pressure and inertial sensor device, in accordance with the present invention.

FIG. 8 shows a flow chart for explaining a specific embodiment of the method of manufacturing a micromechanical component for a pressure and inertial sensor device.

All of the micromechanical components explained above may be produced with the aid of the manufacturing method described in the following. However an ability to practice the manufacturing method is not limited to the manufacture of these micromechanical components.

In a method step S1, a seismic mass is positioned in a subsequent inner volume. To that end (prior to stretching out a diaphragm described below), an upper substrate surface of a substrate and/or at least one intermediate layer covering the upper substrate surface at least partially, is covered at least partially by a semiconductor material layer or a semiconductor material layer stack made up of at least one semiconductor material, and the seismic mass is made of the at least one semiconductor material of the semiconductor material layer or semiconductor material layer stack. For example, the seismic mass may take the form of a rocker-arm structure, which may be set into a rocking motion about an axis of tilt oriented parallelly to the upper substrate surface. However, the other examples of seismic masses described above may also be formed in method step S1.

In a method step S2, a diaphragm is stretched out in such a manner on the substrate having the upper substrate surface, that an inner diaphragm side of the diaphragm is oriented towards the upper substrate surface, an outer diaphragm side of the diaphragm points away from the upper substrate surface, and the inner diaphragm side borders on the inner volume. In addition, as method step S3, the diaphragm is formed to include a sensor electrode, which projects out on the inner diaphragm side and extends into the inner volume. However, method step S3 may also be carried out simultaneously to method step S1, in which the sensor electrode is also made at least partially of the at least one semiconductor material of the semiconductor material layer or semiconductor material layer stack.

As method step S4, a reference pressure is enclosed in the inner volume in such a manner, that the diaphragm is warped in response to a pressure difference between a pressure prevailing on its outer diaphragm side and the reference pressure; the sensor electrode being displaced with respect to the substrate in response to the warping of the diaphragm.

Consequently, the execution of the manufacturing method described here provides the above-mentioned advantages, as well.

What is claimed is:

1. A micromechanical component for a pressure and inertial sensor device, comprising:
   a substrate having an upper substrate surface;
   a stretched-out diaphragm having an inner diaphragm side oriented towards the upper substrate surface and an outer diaphragm side pointing away from the upper substrate surface, the inner diaphragm side bordering on an inner volume, in which a reference pressure is enclosed, and the diaphragm being configured to be warped using a pressure difference between a pressure prevailing on the outer diaphragm side and the reference pressure;
   a seismic mass situated in the inner volume; and
   a sensor electrode, which projects out on the inner diaphragm side, extends into the seismic mass, and is displaceable with respect to the substrate via warping of the diaphragm;
   wherein the seismic mass is made of at least one semiconductor material of a semiconductor material layer or of a semiconductor material layer stack and includes a rocker-arm structure that is settable into a rocking motion about an axis of tilt oriented parallel to the upper substrate surface;
   wherein the sensor electrode is made at least partially of the at least one semiconductor material of the semiconductor material layer or of the semiconductor material layer stack; and
   wherein the diaphragm is stretched out on a frame structure, and the frame structure is made at least partially of the at least one semiconductor material of the semiconductor material layer or of the semiconductor material layer stack.

2. The micromechanical component as recited in claim 1, wherein a reference electrode is situated in the inner volume, is formed independently of the seismic mass, and is also made of the at least one semiconductor material of the semiconductor material layer or semiconductor material layer stack.

3. The micromechanical component as recited in claim 1, wherein a first grounding counter-electrode and a second grounding counter-electrode are attached directly or indirectly to the upper substrate surface in such a manner, that when the rocker-arm structure of the seismic mass is set into a rocking motion about the axis of tilt, a first distance of the rocker-arm structure from the first grounding counter-electrode and a second distance of the rocker-arm structure from the second grounding counter-electrode, vary.

4. The micromechanical component as recited in claim 3, wherein at least one reference counter-electrode is attached directly or indirectly to the upper substrate surface, between the first grounding counter-electrode and the second grounding counter-electrode.

5. A pressure and inertial sensor device, comprising:
 a micromechanical component including:
  a substrate having an upper substrate surface;
  a stretched-out diaphragm having an inner diaphragm side oriented towards the upper substrate surface and an outer diaphragm side pointing away from the upper substrate surface, the inner diaphragm side bordering on an inner volume, in which a reference pressure is enclosed, and the diaphragm being configured to be warped using a pressure difference between a pressure prevailing on the outer diaphragm side and the reference pressure;
  a seismic mass situated in the inner volume; and
  a sensor electrode, which projects out on the inner diaphragm side, extends into the seismic mass, and is displaceable with respect to the substrate via warping of the diaphragm;
 wherein the seismic mass is made of at least one semiconductor material of a semiconductor material layer or of a semiconductor material layer stack and includes a rocker-arm structure that is settable into a rocking motion about an axis of tilt oriented parallel to the upper substrate surface;
 wherein the sensor electrode is made at least partially of the at least one semiconductor material of the semiconductor material layer or of the semiconductor material layer stack; and
 wherein the diaphragm is stretched out on a frame structure, and the frame structure is made at least partially of the at least one semiconductor material of the semiconductor material layer or of the semiconductor material layer stack.

6. A method of manufacturing a micromechanical component for a pressure and inertial sensor device, the method comprising the following steps:
 positioning a seismic mass;
 stretching out a diaphragm on a frame structure in such a manner on a substrate having an upper substrate surface, that an inner diaphragm side of the stretched-out diaphragm is oriented towards the upper substrate surface, an outer diaphragm side of the stretched-out diaphragm is pointed away from the upper substrate surface, and the inner diaphragm side borders on an inner volume in which the seismic mass is positioned due to the positioning step; and
 enclosing a reference pressure in the inner volume in such a manner that the diaphragm is warped in response to a pressure difference between a pressure prevailing on the outer diaphragm side and the reference pressure;
wherein:
 the diaphragm, which has a sensor electrode that projects out on the inner diaphragm side and extends into the seismic mass, is formed in such a manner, that the sensor electrode is displaceable with respect to the substrate in response to warping of the diaphragm;
 the seismic mass is made of at least one semiconductor material of a semiconductor material layer or of a semiconductor material layer stack and includes a rocker-arm structure that is settable into a rocking motion about an axis of tilt oriented parallel to the upper substrate surface;
 the sensor electrode is made at least partially of the at least one semiconductor material of the semiconductor material layer or of the semiconductor material layer stack; and
 the frame structure is made at least partially of the at least one semiconductor material of the semiconductor material layer or of the semiconductor material layer stack.

7. The manufacturing method as recited in claim 6, wherein prior to the stretching-out of the diaphragm, the upper substrate surface and/or at least one intermediate layer, which covers the upper substrate surface at least partially, is covered at least partially by the semiconductor material layer or the semiconductor material layer stack.

* * * * *